United States Patent
Tricart

[19]

[11] Patent Number: 6,125,102
[45] Date of Patent: *Sep. 26, 2000

[54] DISC CARTRIDGE WITH REMOVAL PROTECTOR MEMBER

[75] Inventor: Philippe Tricart, Vallorbe, Switzerland

[73] Assignee: CD Plant Tecval S.A., Switzerland

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/094,809

[22] Filed: Jun. 15, 1998

Related U.S. Application Data

[60] Division of application No. 08/607,726, Feb. 27, 1996, Pat. No. 5,768,253, which is a continuation-in-part of application No. 08/320,129, Oct. 7, 1994, abandoned, which is a continuation of application No. 08/061,844, May 14, 1993, abandoned.

[30] Foreign Application Priority Data

May 15, 1992 [CH] Switzerland ............... 1565/92

[51] Int. Cl.[7] .................................................. G11B 23/03
[52] U.S. Cl. ............................................. 369/291
[58] Field of Search ..................... 369/289, 291; 360/133; 206/308.1, 308.3, 309, 310

[56] References Cited

U.S. PATENT DOCUMENTS

| | | | |
|---|---|---|---|
| 4,185,313 | 1/1980 | Green et al. ............................ | 360/133 |
| 4,194,228 | 3/1980 | Duff ........................................ | 360/133 |
| 4,343,546 | 8/1982 | Urquhart ................................ | 354/281 |
| 4,471,397 | 9/1984 | Cloutier ................................. | 360/133 |
| 4,702,369 | 10/1987 | Philosophe ............................ | 206/312 |
| 4,748,530 | 5/1988 | Barnes ................................... | 360/133 |
| 4,793,480 | 12/1988 | Gelardi et al. ........................ | 206/312 |
| 4,899,875 | 2/1990 | Herr et al. ............................. | 206/313 |
| 5,208,802 | 5/1993 | Suzuki et al. ......................... | 369/289 |
| 5,370,224 | 12/1994 | Karakane et al. ..................... | 206/309 |
| 5,475,674 | 12/1995 | Yamashita et al. ................... | 369/291 |
| 5,768,253 | 6/1998 | Tricart .................................. | 369/291 |

FOREIGN PATENT DOCUMENTS

| | | |
|---|---|---|
| 0 139 146 A2 | 5/1985 | European Pat. Off. . |
| 0 192 188 A3 | 8/1986 | European Pat. Off. . |
| 0 230 695 A1 | 8/1987 | European Pat. Off. . |
| 0 240 170 A1 | 10/1987 | European Pat. Off. . |
| 0 270 182 A2 | 6/1988 | European Pat. Off. . |
| 0 277 809 B1 | 8/1988 | European Pat. Off. . |
| 0 278 358 A1 | 8/1988 | European Pat. Off. . |
| 0 319 301 A2 | 6/1989 | European Pat. Off. . |
| 0 370 690 A2 | 5/1990 | European Pat. Off. . |
| 2 587 974 | 4/1987 | France . |
| 2319993 | 11/1974 | Germany ............................ 369/291 |
| 2 173 631 | 10/1986 | United Kingdom . |

Primary Examiner—William R. Korzuch
Attorney, Agent, or Firm—Clifford W. Browning; Woodard, Emhardt, Naughton, Moriarty & McNett

[57] ABSTRACT

A disc cartridge having a casing designed to accommodate the disc and to allow the read-out and/or the recording of information while the disc is housed in the casing. The recording discs concerned may be of the type generally designated as "compact disc" or "CD", and more particularly information carrying discs called "CD ROM", although the invention is not limited to this type of disc.

6 Claims, 8 Drawing Sheets

DISC CARTRIDGE WITH REMOVAL PROTECTOR MEMBER

RELATED APPLICATION

The present application is a division of U.S. patent application Ser. No. 08/607,726, filed on Feb. 27, 1996, now U.S. Pat. No. 5,768,253, which is a continuation-in-part of U.S. patent application Ser. No. 08/320,129, filed on Oct. 7, 1994, now abandoned, which is a continuation of U.S. patent application Ser. No. 08/061,844, filed on May 14, 1993, now abandoned.

BACKGROUND OF THE INVENTION

1. Field of the Invention

This invention relates to disc cartridges for accommodating recording discs capable of having information recorded thereon and read out by an appropriate reading apparatus. More particularly, the invention relates to a disc cartridge comprising a casing designed to accomodate the disc and to allow the read-out and/or the recording of information while the disc is housed in said casing. The recording discs concerned may be of the type generally designed as "compact disc" or "CD", and more particularly information carrying discs called "CD ROM", although the invention is in no way limited to this type of disc.

2. Related Art

Disc casings of the type referred to herein are being produced by various manufacturers according to a similar basic design in order to be usable in standardized reading apparatus, in which the disc is read while housed in the casing. Such known disc casings, also called cartridges, generally comprise a lower casing element designed to accomodate the disc, the bottom of this element comprising an opening, a first part of which is designed to provide a passage for a shaft for driving the disc in rotation, this shaft belonging to a disc-reading apparatus, and a second part of which is designed to provide access for a disc-reading device belonging to the same apparatus. The lower casing element is usually closed by a casing cover constructed in such a manner as to make possible the closing or the opening of the casing and provide a plane wall facing the bottom of the lower casing element.

According to a known casing design, a movable shutter is provided on the casing for closing the opening in the bottom of the lower casing element to protect the disc against risk of mechanical damage and to limit the penetration of dust inside the casing when the disc is not used in the reading apparatus. This shutter is provided with a mechanical device for ensuring its automatic retraction and disengagement from said opening when the casing is introduced into the reading apparatus, and for ensuring its return to its closing position when the casing is withdrawn from the reading apparatus. Such a device generally includes actuating levers and at least one spring and is therefore relatively complicated, fragile and expensive. Hence the manufacturing cost of such a disc casing is rather high and there is further a non negligible risk of defective functioning, in particular when the casing reaches a more or less advanced state of wear.

Prior art disc casings are usually provided with a disc clamping element comprising generally a circular part of a plastic material in which is housed a plate made of a magnetic material, this clamping element being designed to be attracted towards the surface of a frontal magnetized end of the driving shaft for rotating the disc, thereby ensuring the locking of the disc with this shaft. This clamping element is retained in a housing arranged in the cover of the casing opposite the bottom of the lower casing element, in such a manner as to provide for free rotation of this element in relation to the casing when the same is placed inside the reading apparatus and the driving shaft is locked with the disc. The presence of such a clamping element as a part of the disc casing also leads to increased costs for such a type of casing.

In the prior art casings, a further major drawback results from a certain freedom of the disc to move within the casing when the same is not inserted in a reading or recording apparatus, in particular during transportation. Such a movement of the disc inside the casing produces frictional wear resulting in fine particles which can come to lie on the surface of the disc and create perturbations in the reading or recording process. In the case of recordable discs, currently designated as CDR:s, it is particularly important that the surface of the disc remains free form dust or other contaminations before the disc is being recorded, which is not assured when the disc is housed in a prior art casing where it can move inside its compartment.

SUMMARY OF THE INVENTION

The present invention provides a disc cartridge which overcomes the drawbacks of the prior art casings. In particular, the invention overcomes the drawbacks resulting from the presence of a shutter mechanism in the prior art casings and from the movability of the disc inside these casings by providing a cartridge comprising a removable protector member, said protector member comprising a bottom plate providing a wall closing the opening of the bottom of the lower casing element as well as engaging means for engaging the lower casing element so as to keep together the protector member and the lower casing element, said engaging means comprising locking means adapted to extend through the first part of said opening and to become engaged in the central hole of a recording disc placed in the lower casing element, so as to maintain the recording disc in a fixed position with respect to the lower casing element.

According to another embodiment, a cartridge overcoming said drawbacks comprises a removable locking member placed between the bottom plate and the bottom of the lower casing element, said locking member comprising locking means adapted to extend through the first part of said opening and to become engaged in the central hole of a recording disc placed in the lower casing element, so as to maintain the recording disc in a fixed position with respect to the lower casing element.

According to another embodiment avoiding the use of a shutter mechanism, the disc cartridge comprises a protector member arranged for removably receiving at least said lower casing element, said protector member comprising a bottom plate and at least two wall portions, said bottom plate providing a wall closing at least that part of the opening of the bottom of the lower casing element which provides access for the disc-reading device when the latter is placed in said protector member, said wall portions being each provided with a ledge extending from the free edge of said wall portion over at least a portion of the length of said edge, so as to retain said lower casing element when the same is placed in said protector member.

According to a particular embodiment of such a cartridge, the protector member forms a drawer wherein said bottom plate provides a wall entirely closing the opening of the bottom of the lower casing element when the latter is placed in said drawer, said wall portions including two side-wall portions and a back-wall portion, each of said wall portions being provided with said ledges, so as to retain said lower casing element when the same is placed in said drawer.

The ledge of said back-wall can be arranged for retaining the cover of the lower casing element when the same is placed with its cover in the drawer. According to a preferred embodiment, the ledges of the wall portions are however dimensioned so as to make possible the closing or the opening of the casing when the lower casing element is placed in the drawer.

According to a preferred embodiment of the invention, to overcome the drawback of the prior art casings resulting from the movability of the disc inside these casings, the cartridge further comprises a removable locking member, said locking member comprising at least a first portion arranged for fitting into the central part of the opening in the bottom of the casing, said locking member being arranged for being maintained in place when said first portion of the same is fitted into the central part of said opening and the lower casing element is placed inside the drawer, said first portion of said locking member comprising locking means adapted for becoming engaged in the central hole of the recording disc for maintaining said disc in a fixed position with respect to the bottom of the lower casing element. According to one embodiment, the locking member comprises a second portion extending across said second part of said opening in the bottom of the disc casing, up to the back-wall portion of the drawer. Preferably, in such an embodiment, at least a part of the second portion of the locking member is arranged for fitting into the outer part of the opening in the bottom of the lower casing element.

According to another preferred embodiment, the bottom plate of the drawer comprises a central hole arranged for receiving a removable central locking member, said locking member being adapted to be fitted into said hole and to become engaged in the central hole of the recording disc, so as to maintain the disc in a fixed position with respect to the bottom of the lower casing element when the same is placed in the drawer.

According to still another preferred embodiment of the invention, the protector member comprises a flexible bottom plate, a front-wall portion and a back-wall portion, said ledges, which extend from said side-wall portions, having a width allowing said lower casing element to be removed from the protector member when at least one of said front-wall and back-wall portions is being pressed manually so as to become separated from said casing element as a result of a bending of said bottom plate. Preferably, the bottom of said lower casing element having at least one hole, said bottom plate of said protector member comprises at least one protruding part adapted for fitting into said hole of the lower casing element.

According to a particular embodiment of such a cartridge, the bottom plate of the protector member comprises a protruding locking portion arranged for fitting into at least said first part of the opening in the bottom of said lower casing element, said locking portion comprising locking elements adapted for becoming engaged in said central hole of said recording disc, so as to maintain the disc in a fixed position with respect to the bottom of the lower casing element when the same is placed in the protector member.

According to another embodiment, such a cartridge comprises a removable locking member, said locking member comprising at least a first portion arranged for fitting into said first part of the opening in the bottom of the lower casing element, the locking member being arranged for being maintained in place when the first portion of the same is fitted into the first part of the opening of the lower casing element and the same is placed inside the protector member, said first portion of the locking member comprising locking elements adapted for becoming engaged in the central hole of the recording disc for maintaining the same in a fixed position with respect to the bottom of the lower casing element.

According to a particular embodiment of such a cartridge, the locking member comprises a second portion extending across said second part of said opening up to the back-wall or the front-wall portion of the protector member. Furthermore, the bottom plate of the protector member preferably has protruding positioning portions arranged for cooperating with border portions of said removable locking member to define the position thereof with respect to the bottom plate.

According to yet another embodiment of the invention, the disc cartridge further comprises a removable central locking member and the bottom plate of the protector member comprises a central hole arranged for receiving said removable central locking member, said locking member being adapted for fitting into said hole and for becoming engaged in the central hole of the recording disc, so as to maintain said disc in a fixed position with respect to the bottom of the lower casing element when the same is placed in the protector member.

It is to be noted that the various embodiments of the invention which include a locking member or locking portion all overcome the drawback of the prior art casings resulting from the movability of the disc inside these casings in addition to the fact that they avoid the use of a shutter mechanism.

BRIEF DESCRIPTION OF THE DRAWINGS

FIG. 5a is a perspective view showing a particular embodiment of a disc casing for a cartridge according to the invention, adapted to be used with a protector and locking member as shown in FIGS. 7a and 8a.

FIG. 7a is a plan view of a protector and locking member for use with a disc casing according to FIG. 5a.

FIG. 8a is a cross-sectional view of the protector and locking member of FIG. 7a.

DETAILED DESCRIPTION OF PREFERRED EMBODIMENTS

Figure 1:
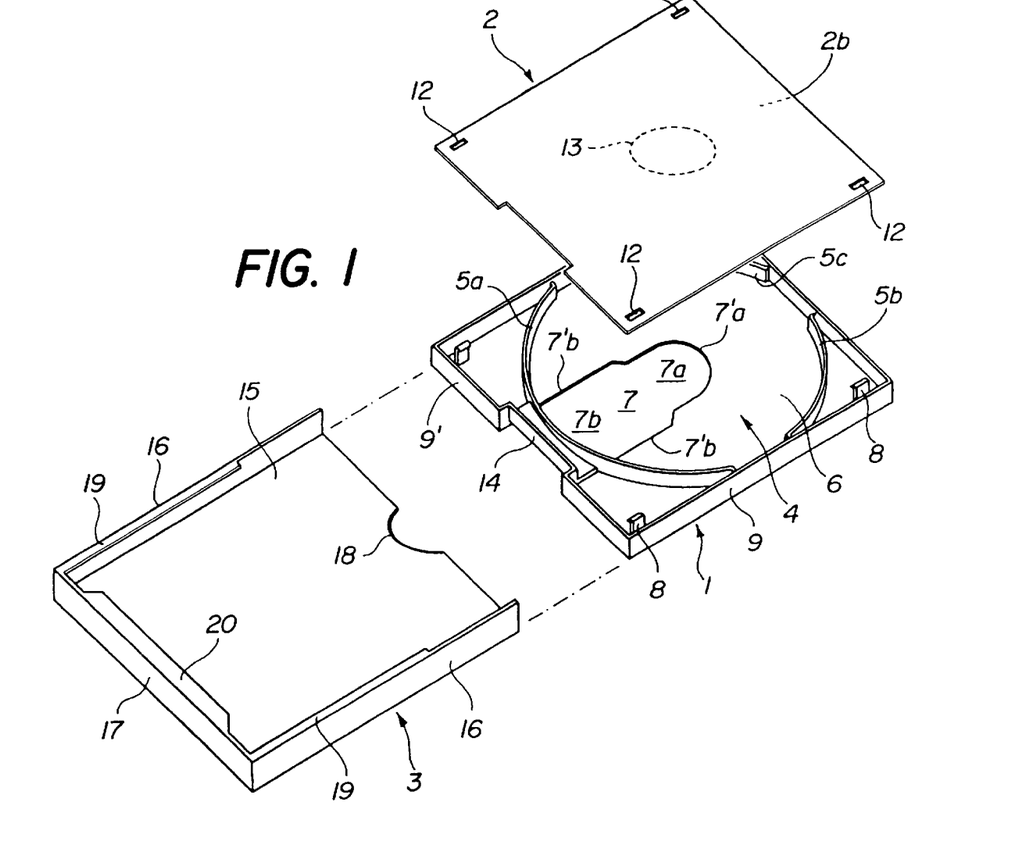
FIG. 1 is a perspective view showing a disc cartridge according to the invention.

The cartridge according to the embodiment shown in FIG. 1 comprises a lower casing element 1, a casing cover 2 and a protector member in the form of a drawer 3.

The lower casing element 1 includes a compartment 4 for receiving a disc, not shown, this compartment being defined by three arcuate wall portions 5a, 5b, 5c.

The bottom 6 of the lower casing element 1 has an opening 7, one part 7a of which, as defined by an arcuate edge 7'a, is arranged in the central part of the bottom 6 and is designed to provide a passage for a shaft for driving the disc in rotation when the casing formed of parts 1 and 2 is placed inside an apparatus for reading the disc in a manner known per se. The remaining of the opening 7 is a part 7b, as defined by two edges 7'b, arranged to provide access for a disc reading device, for example an optical laser reading device, not shown, belonging to the reading apparatus.

Figure 2:
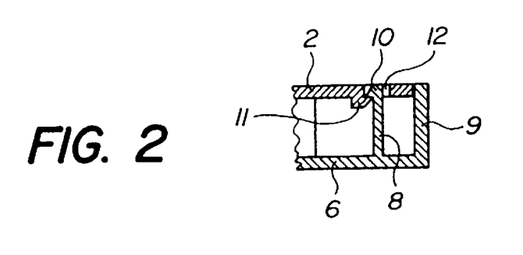
FIG. 2 is a cross-sectional view showing a detail of the cartridge of FIG. 1.

The position, the dimensions and the shape of the opening 7 as well as more generally the shape and the outer dimensions of the lower casing element 1 correspond to those of the casings currently available on the market for discs of the CD-ROM type. The casing cover 2 is designed so that it may be fastened removably to the lower casing element 1 after insertion of a disc, not shown, in the compartment 4. The fastening of the cover 2 on element 1 is ensured by four hooked retaining fingers 8 consisting of thin strips protruding from the bottom 6 and inwards of element 1 in the vicinity of each one of its corners and running parallel to side-walls 9 of element 1. As shown in FIG. 2, the end of each one of these fingers 8 is provided with a hook 10 arranged so as to snap back on a ledge 11 protruding inside an opening 12 arranged adjacent each one of the corners of the cover 2. For separating the cover 2 from the lower element 1, each hook 10 can be released from the ledge 11 by a slight flexion of the corresponding finger 8. A circle shown in phantom in FIG. 1 indicates the location of an optional housing 13 on the lower face 2b of cover 2. This housing 13, when provided, is designed for retaining a rotatory disc clamping element similar to that of conventional casings.

The front-wall 9' of the lower casing element 1 has a recessed portion 14 which is used in particular for the correct insertion of the casing into a disc reading apparatus.

The drawer 3 is arranged for receiving, by a translatory movement as illustrated in FIG. 1, the casing assembly comprised of the lower casing element 1 closed by its cover 2. The drawer has a bottom 15, two side-walls 16 and a back-wall 17. The drawer 3 is shown in FIG. 1 to have the full depth of the casing 1, i.e. its bottom 15 and side-walls 16 cover at least approximately the entire bottom 6 and side-walls 9 of the lower casing element. In this case, preferably an arcuate cut-out 18 is provided in the frontal edge of bottom 15, which makes it easier to grip the casing with the hand when removing it from the drawer 3.

According to similar embodiment, the drawer may have a lesser depth than the casing 1, but it must cover at least the opening 7 when the casing 1 is placed in the drawer.

Two side-ledges 19 extending from the free edges of the side-walls 16 over a portion of the length of these edges and an end-ledge 20 extending from the free end of the front-wall 17 are arranged for retaining the assembly formed by the casing element 1 and its cover 2 when the same is placed in the drawer 3. In that position, the drawer 3 completely closes the opening 7, thereby ensuring an efficient protection of a disc, placed in the compartment 4.

It will be seen that the parts 1, 2 and 3 of the cartridge are of very simple shape and can therefore be produced by molding from a plastic material at a low cost.

Figure 3:
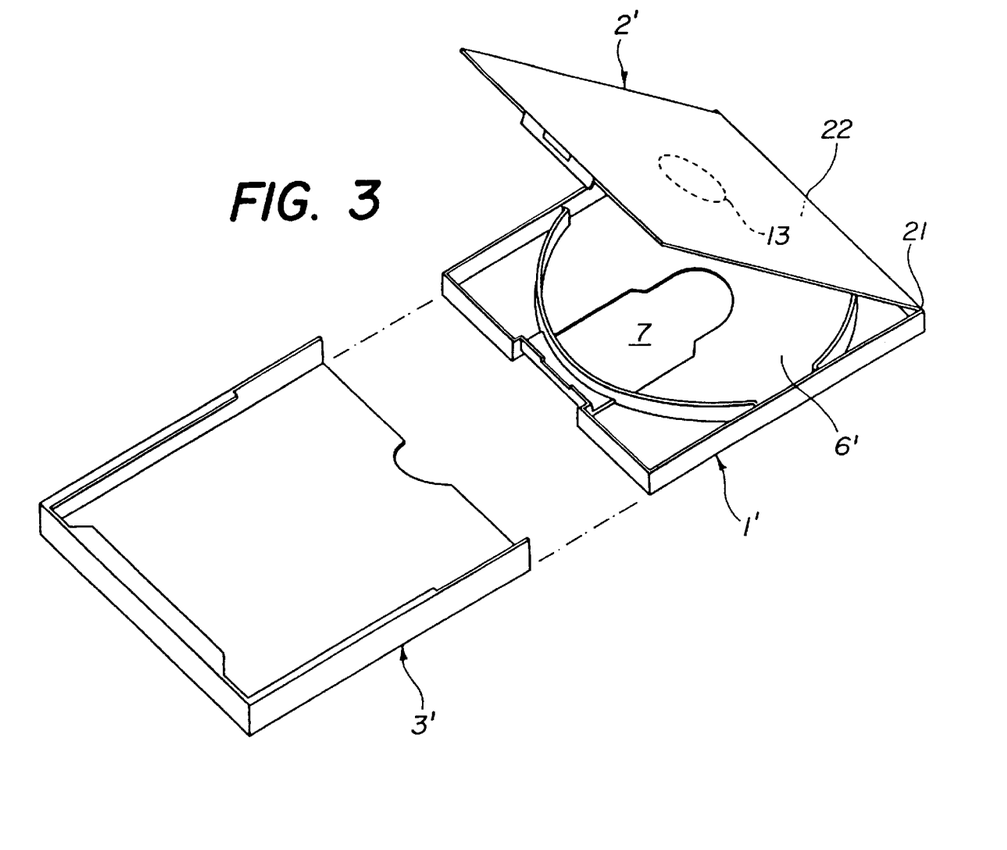
FIG. 3 is a perspective view showing another embodiment of a cartridge according to the invention.
Figure 4:
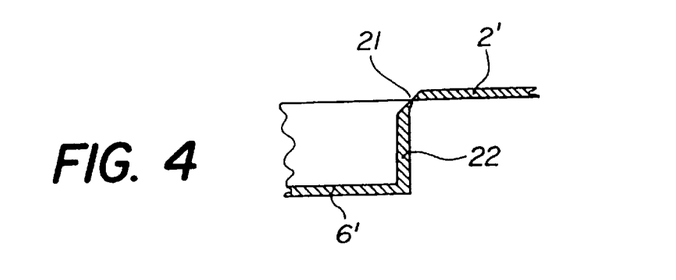
FIG. 4 is a cross-sectional view showing a detail of the cartridge of FIG. 3.

The cartridge shown in FIG. 3 is similar to that of FIG. 1 and differs from the same mainly in that the cover 2' is attached to the lower casing element 1' by means of a hinge. FIG. 4 shows this hinge being formed by a constricted wall section 21 between the back-wall 22 of the casing element 1' and the cover 2', both elements 1' and 2' being advantageously molded from a plastic material as one part. Reference 6' designates the bottom of the casing element 1' and reference 3' the drawer of the cartridge.

Figures 5, 6, 7, 8:
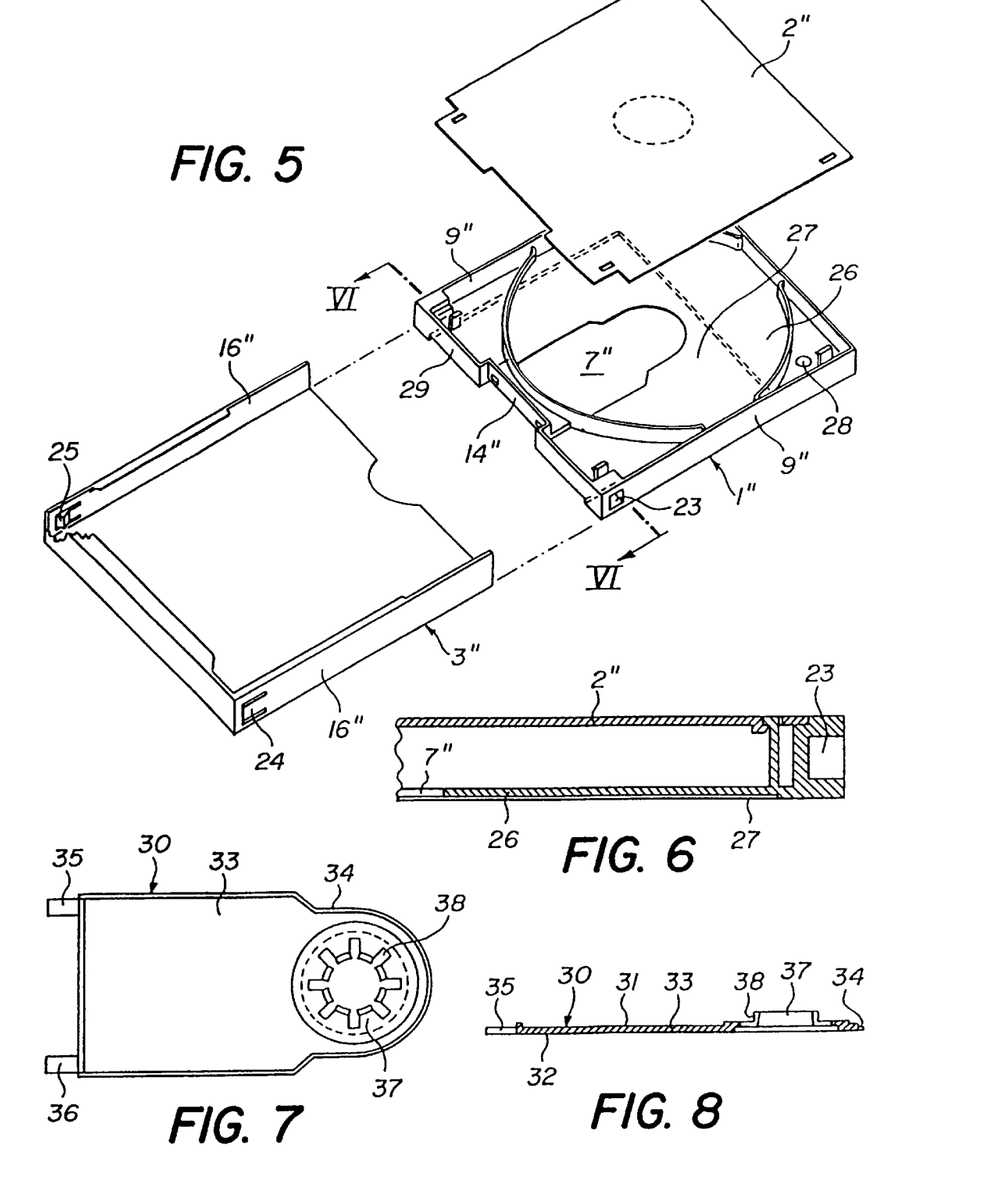
FIG. 5 is a perspective view showing a cartridge according to the invention which is similar to the one of FIG. 1.
FIG. 6 is a cross-sectional view along the line VI, VI of FIG. 5 showing a detail of the cartridge.
FIG. 7 is a plan view showing a removable locking member.
FIG. 8 is a cross-sectional view of the locking member of FIG. 7.

FIG. 5 shows some further details of an embodiment of the cartridge of the present invention, similar to that of FIG. 1. It can in particular be seen that the lower casing element 1" has lateral recesses such as 23 which cooperate with tongue-like portions 24, 25 in the side walls 16" of the drawer 3" to retain the casing element 1" inside the drawer.

FIG. 5 and the cross-sectional view of FIG. 6 show the bottom 26 of the casing element 1" being slightly reduced in height over an area 27 of that bottom indicated by a dotted line in FIG. 5. Furthermore, FIG. 5 shows the bottom 26 having a hole 28 which is one of a pair of holes provided symmetrically in the vicinity of opposite lateral walls 9". In FIGS. 5 and 6, the opening of the bottom 26 is designated by the reference 7" and the cover of the casing element 1" by the reference 2". The reference 29 designates a front-wall portion of the lower casing element 1" and the reference 14", the recessed portion of the front-wall.

FIG. 7 shows an elongated locking member 30 which is a substantially flat part of plastic material adapted for being removably inserted into the opening 7" of the lower casing element 1" of FIG. 5, for example. The outer shape of locking member 30 therefore corresponds to that of the border of the opening 7" and its thickness is such that, when inserted, the upper surface 31 and the bottom surface 32 of its body portion 33 are flush, respectively, with the inner surface of the bottom 26 surrounding the opening 7" and with the outer surface of the bottom 26 where the same has the greatest thickness, i.e. outside the zone 27. The border of the locking member 30 has a step-shaped profile as shown at 34 in FIGS. 7 and 8, for fitting into the opening 7".

Furthermore, the locking member 30 further has two extensions 35, 36, the free ends of which are level with the front-wall portion 29 of the lower casing element 1" when the locking member 30 is fitted into the opening 7". Accordingly, when the lower casing element 1" is inserted in the drawer 3", the locking member is maintained in a well determined fixed position with respect to the bottom 26 of the lower casing element.

The locking member 30 is provided with a crown-shaped portion 37 which comprises protruding tongue-shaped locking elements 38 arranged for fitting into the central hole of a recording disc to hold the same in a fixed position with respect to the casing 1", 2", more particularly in a centered position with respect to the walls or wall portions of its compartment, such as the compartment 4. This is quite important in order to avoid frictional wear between the disc and the casing as it otherwise occurs, in particular during transportation and handling of the cartridges.

Figure 9:
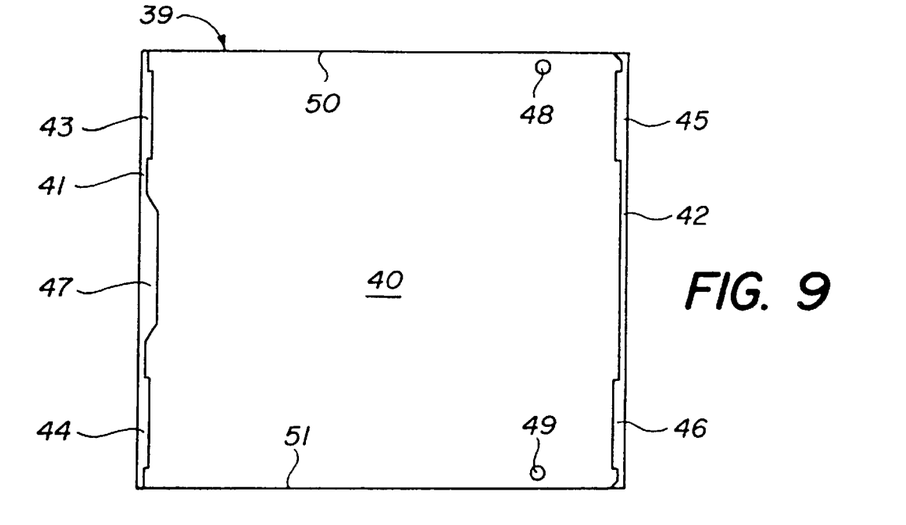
FIG. 9 is a plan view showing a protector member according to another embodiment of the cartridge of the invention.
Figure 10:
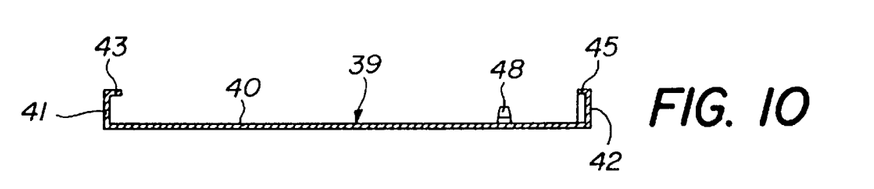
FIG. 10 is a cross-sectional view of the protector member of FIG. 9.

FIGS. 9 and 10 show another embodiment of a protector member which can be used in place of the above described drawer in connection with a disc casing 1", 2" as shown in FIGS. 5 and 6. The protector member 39 comprises a bottom plate 40 and two wall-portions, namely front-wall and back-wall portions 41, 42. These wall portions are provided with respective ledge portions 43, 44 and 45, 46 which extend from the free edges of the wall portions and preferably have a width so as to overlap only the corresponding wall portions of the lower casing element 1", but not the cover 2". This makes it possible to open and close the disc casing even when the same is placed in its protector member 39. A ledge portion 47 extending inwardly from the front-wall 41 has a length and width which are smaller than the length and depth of the recessed wall-portion 14" of the lower casing element and the length and depth of a corresponding cut-out of the cover 2" shown in FIG. 2. The bottom plate 40 of the protector member 39 is provided with two protruding parts 48, 49 having the form of short pins with a tapered or rounded end. These protruding parts extend from the bottom plate 40 at locations corresponding to the location of corresponding holes in the bottom of the lower casing element 1", one of which, 28, is shown in FIG. 5.

The protector member 40 has no lateral walls and its width between its lateral edges 50, 51 is equal to that of the lower casing element 1". This makes it possible to insert the cartridge formed by the assembly of parts 1", 2" and 39 into ususal storage means provided for storing conventional disc casings of standardized dimensions.

The assembly and disassembly of the disc casing 1", 2" and the protector member 39 make use of the inherent flexibility of the bottom plate 40 which allows resilient bending to separate the opposite wall portions 41, 42 by the small distance necessary for placing the lower casing element 1" between the same. This bending can easily be effected by pressing on the ledge portion 47 while holding the member 39 on the opposite side. The protruding parts 48, 49 cooperate with the corresponding holes in the bottom 26 of the lower casing element to position and maintain the same on the bottom plate 40.

Figure 11:
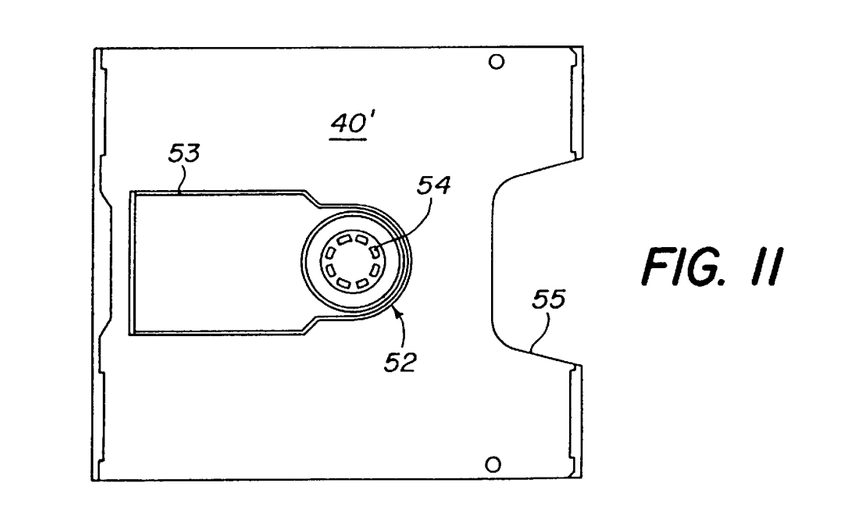
FIG. 11 is a plan view showing another embodiment of a protector member of a cartridge according to the invention.
Figure 12:
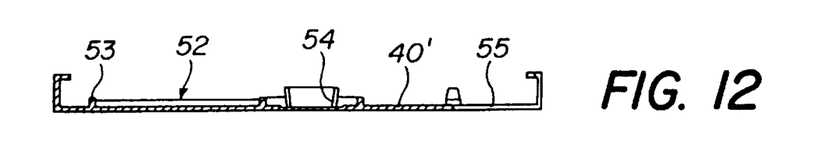
FIG. 12 is a cross-sectional view of the protector member of FIG. 11.

FIGS. 11 and 12 show a protector member similar to the one of FIGS. 9 and 10. In this embodiment, the bottom plate 40' of the protector member is provided with a protruding locking portion 52 comprising a peripheral ridge 53 having the shape of the border of the opening 7" in the bottom of the lower casing element 1". The locking portion 52 is thus arranged to fit into the opening 7". This provides an improved closure of this opening and also maintains the lower casing element in its position. This latter function can replace that of the protruding parts 48, 49 of FIGS. 9 and 10, but such protruding parts are preferably provided in addition. The locking portion further comprises a crown-shaped portion including resilient locking elements 54 projecting from the bottom 40' for becoming engaged in the central hole of a recording disc placed inside the casing 1", 2". The function of these locking elements is the same as that of the locking elements of the removable locking member 30 described in relation with FIGS. 7 and 8.

FIGS. 11 and 12 further show the bottom plate 40' having a cutout portion 55 which makes it possible to hold the disc casing 1", 2" when assembling the same with the protector member or disassembling the same therefrom.

Figures 13, 14:
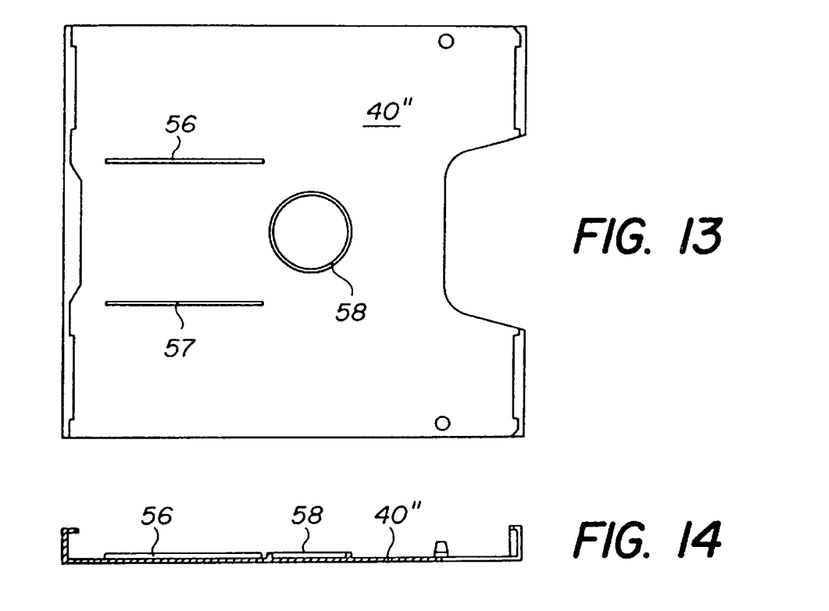
FIG. 13 is a plan view showing yet another embodiment of a protector member of a cartridge according to the invention.
FIG. 14 is a cross-sectional view of the protector member of FIG. 13.

FIGS. 13 and 14 show another embodiment of a protector member similar to those of FIGS. 9 to 12. In this embodiment, the bottom plate 40" is provided with protruding positioning portions 56, 57 and 58 which are formed as ridges projecting from the bottom plate. The arrangement of these ridges is such that it provides for a precise positioning of a removable locking member as described in relation with FIGS. 7 and 8. More particularly, the ridges 56 and 57 are arranged to be placed on either side of the body part 33 of that locking member and ridge 58, having for example a circular shape, is placed so that it penetrates into a corresponding circular recess in the bottom surface 32 of the locking member when that member is placed on the bottom plate 40". This ensures in particular that the central, crown-shaped portion 37 of the locking member is well centered with respect to the disc compartment.

The protector member of FIG. 13 is thus designed for use with a removable locking member, the structure and the function of which have been described in relation with FIGS. 7 and 8. It is to be mentioned that such a separable locking member can also be used in connection with a protector member as shown in FIGS. 9 and 10, although the presence of positioning means, as provided by the ridges 56, 57 and 58, is preferred.

Figure 15:
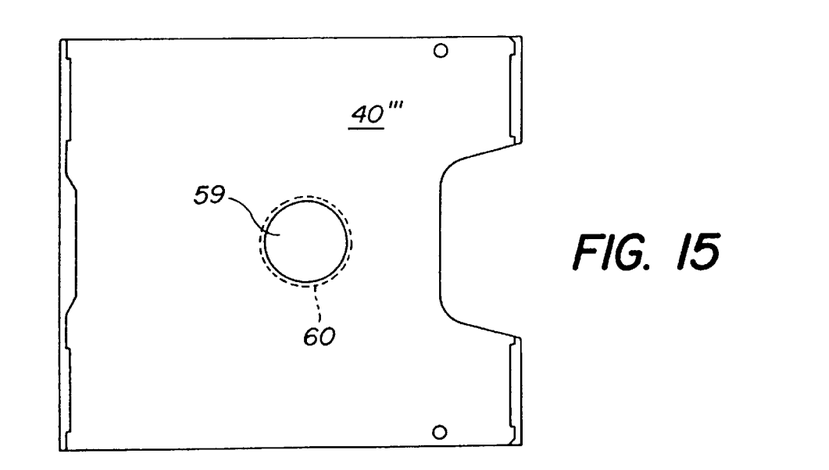
FIG. 15 is a plan view showing a protector member according to still another embodiment of the cartridge according to the invention.
Figure 16:
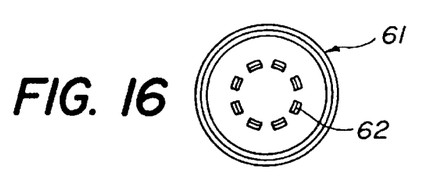
FIG. 16 is a plan view showing a removable central locking member of the cartridge of FIG. 15.
Figure 17:
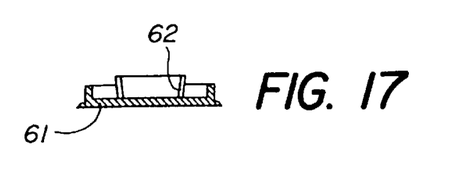
FIG. 17 is a cross-sectional view of the locking member of FIG. 16.

FIGS. 15 to 17 illustrate an alternative solution for providing a locking function to fixedly maintain a recording disc in the cartridge, by means of a removable locking member. In this embodiment, the protector member of FIG. 15 is provided with a central hole 59 through its bottom plate 40'''. The outer surface of the bottom plate 40''' has a small circular recess 60 surrounding the hole 59.

FIGS. 16 and 17 represent a removable locking member 61 of circular shape adapted for fitting into the hole 59 and recess 60 from the outer or bottom side of the plate 40''', so that the lower surface of the member 61 is flush with the outer surface of the protector member. In a similar way as the crown-shaped locking portion described in relation with FIGS. 11 and 12, the locking member 61 has a series of tongue-shaped locking elements 62 which are arranged for penetrating into the central hole of a recording disc placed inside a casing 1", 2". While the locking function of the locking member 61 is similar to that of the removable locking member 30 of FIG. 7, the embodiment of a cartridge of FIG. 15 automatically provides for removal of the locking member when the disc casing 1", 2" is separated from the protector member.

A similar central locking member adapted for insertion through a central hole in the protector member can also be used in a structure where the disc casing is arranged for being placed in the protector member by a translatory movement. In such a case, the locking member will have to be removed from the bottom plate of the protector member from the outside thereof.

It is further to be noted that the locking elements of the locking member can have various appropriate shapes to fulfill their locking/clamping function for holding the disc in a well-defined fixed position inside its casing when they are engaged in the central hole of the disc.

Figure 5A:
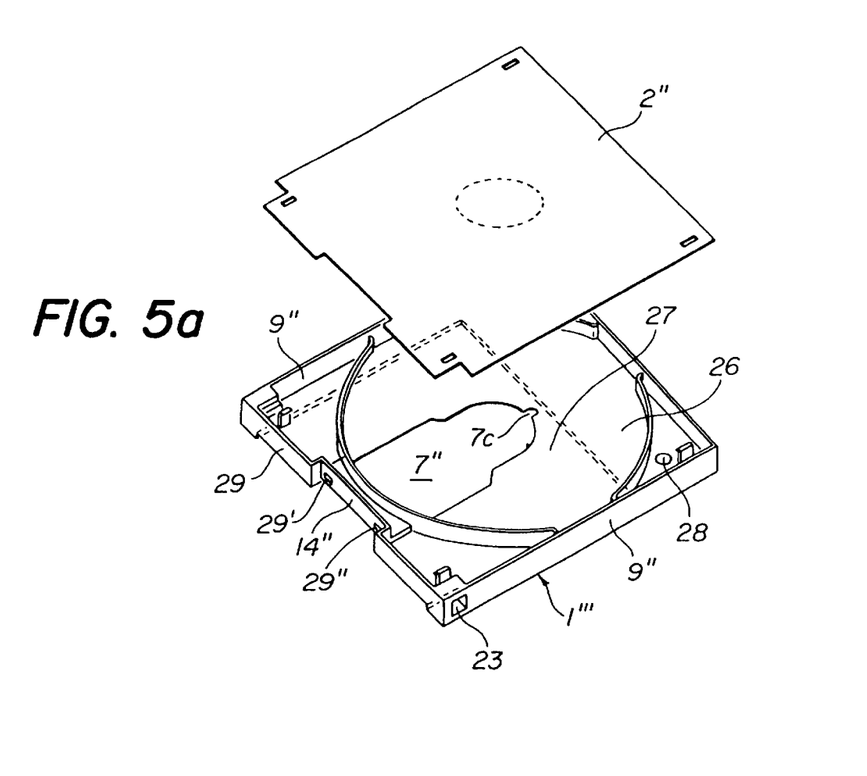
Figure 7A:
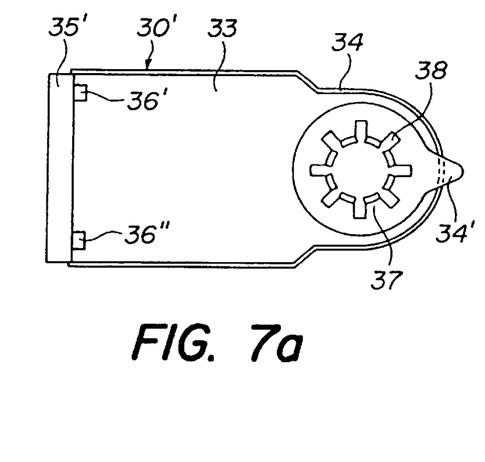
Figure 8A:
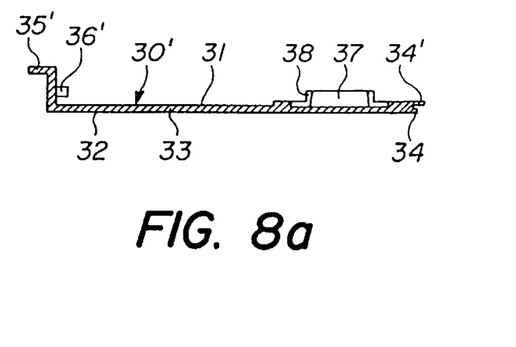

FIGS. 5a, 7a and 8a illustrate a cartridge according to the invention which comprises a disc casing with a lower element 1'", similar to the one illustrated in FIG. 5 but adapted so that a protector and locking member 30', as shown in FIGS. 7a and 8a, can be removably mounted thereon. The protector and locking member 30" is similar to the locking member 30 of FIGS. 7 and 8, but is provided with a nose 34' and a wall and ledge portion 35' bearing two protrusions 36', 36". The lower casing element 1'" has a notch 7c in its bottom 26 and its recessed front-wall portion 14" has two holes 29' and 29". The protrusions 36', 36" are adapted to be inserted, respectively, into the holes 29', 29" and the nose 34' is adapted to cooperate with a corresponding portion of the bottom 26 so that the member 30' can be clipped onto the lower casing element 1'". When mounted, the member 30' is fitted in and fully closes the opening 7", while its locking elements 38 are maintaining a disc, not shown, in a fixed position inside the disc casing, in a similar manner as in the case of the locking member of FIGS. 7 and 8. To remove the member 30', the same can be seized by the ledge portion of 35' and drawn out until the nose 34' can pass through the notch 7c, the central portion of the member 30' being then withdrawn from the hole of the disc and the whole member 30' removed.

Figure 18:
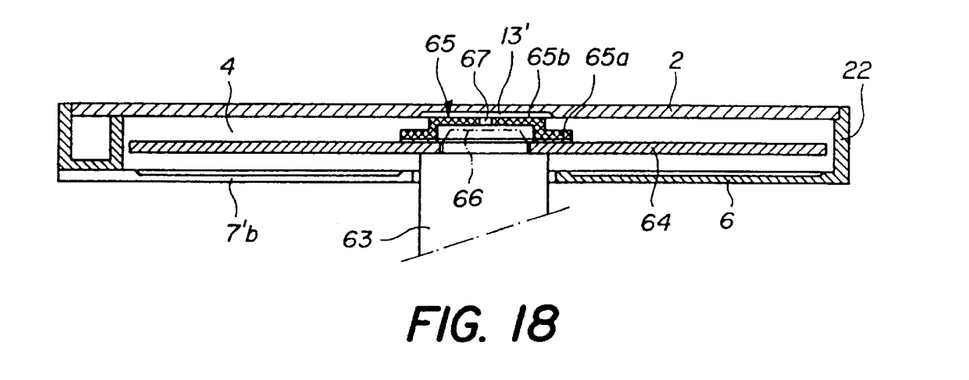
FIG. 18 is a cross-sectional view showing the position of a disc casing without disc clamping element, of a disc including a clamping element fastened on the disc itself and of the shaft for driving the disc in rotation when the casing is in its reading position in an apparatus for reading the information recorded on the disc.

FIG. 18 shows the position of the elements of a disc casing which have been designated by the same reference numerals as in FIG. 1, in relation with a shaft 63 of a disc reading apparatus. A disc 64 placed inside the casing is, in this embodiment, provided with a circular part having a central depression surrounded by a flat circular ledge 65a, the bottom 65b of the part 65 consisting of a small plate of a non permanently magnetizable material, such as soft iron. The part 65 is concentrically fixed to the disc 64 so as to surround the central opening thereof.

When the frontal surface 66 of the magnetized end of shaft 63 is placed in the central opening of the disc in a manner known per se, the portion 65b of part 65 is attracted by the shaft and rotatably locked therewith. In order to avoid excessive air pressure that could build up inside the central opening of the disc 64, a small opening 67 is provided in the center of part 65 to act as a vent. This prevents uncontrolled movement of the part 65 and avoids the risc of a suction effect when the end of shaft 63 is pulled out from the disc hole.

As shown in FIG. 18, the cover has no housing for retaining a disc clamping element at the location indicated by the circle 13 in FIGS. 1 and 3, but simply a thinner portion indicated by the numeral 13' which avoids friction from occurring between the clamping element 65 and the inner surface of the cover 2 when the cartridge is in the disc reading position.

Figure 19:
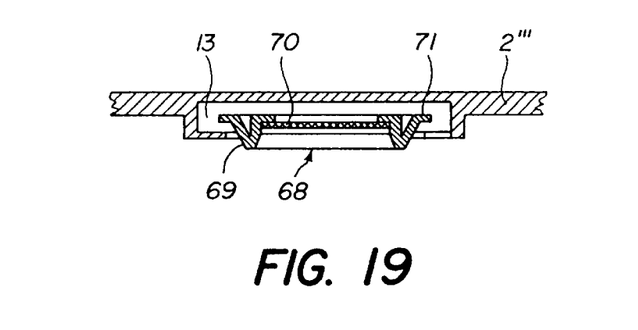
FIG. 19 is a cross-sectional view showing a disc clamping element arranged in a housing made inside the cover of a casing according to one embodiment of the cartridge of the invention provided with such a clamping element.

FIG. 19 shows a disc casing cover 2'" which is provided with a disc clamping element designated as a whole by 68. This clamping element 68 comprises a ring-shaped part 69 in which a circular plate 70 of not permanently magnetizable material is mounted in a concentric position. The clamping element has a flexible peripheral edge 71 which makes it possible to insert the clamping element into a housing 13 of the cover plate 2'".

Figure 20:
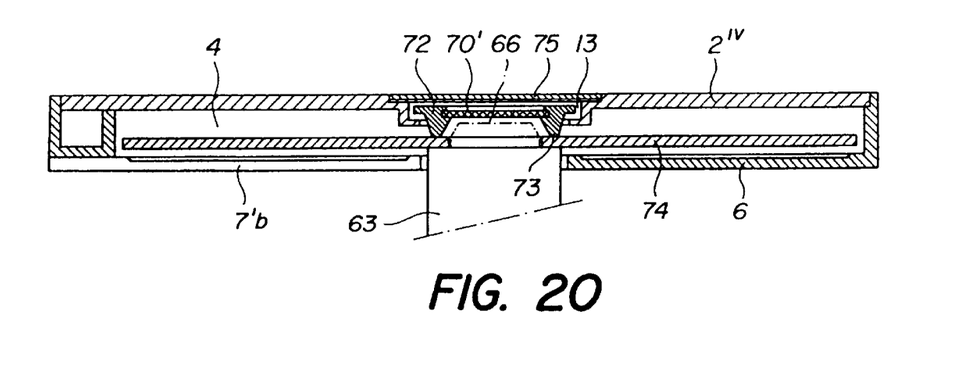
FIG. 20 is a cross-sectional view showing the position of a casing provided with a disc clamping element and of a disc locked with the disc driving shaft when the casing is in the reading position inside a reading apparatus.

FIG. 20 shows the position of a driving shaft inserted in the reading position in a disc casing, the cover $2^{IV}$ of which comprises a clamping element 72 including a circular plate 70' with a magnetizable plate 70,similar to that of FIG. 19.

As can be seen in FIG. 20, the clamping device is attracted by the frontal surface 66 of the shaft 63, whereby the surface 73 of the clamping device presses firmly against the upper surface of disc 74 around the central opening thereof, thus locking the disc with the shaft 63. In the embodiment of FIG. 20, the housing 13 is closed by a wall element 75, the clamping element being inserted into the housing cavity 4 through an opening then closed by the wall element 75.

Figure 21A:
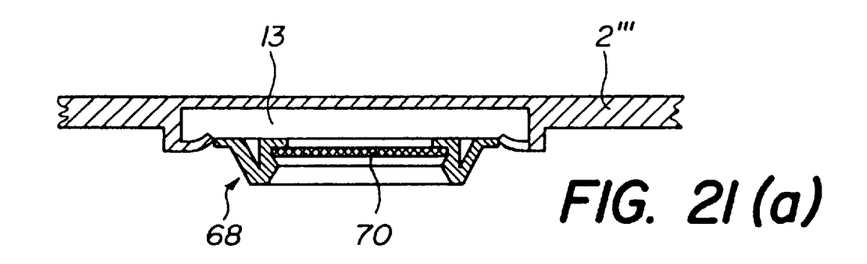
FIG. 21(a) is a cross-sectional view illustrating the insertion of a disc clamping element into the casing according to FIG. 20
Figure 21B:
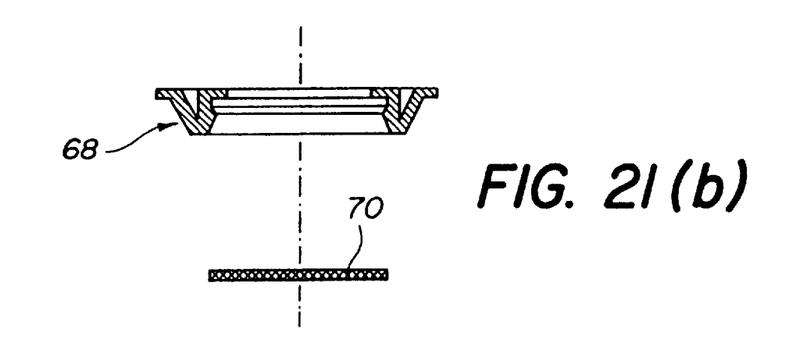
FIG. 21(b) is a cross-sectional view showing the parts of the disc clamping element before assembly.

FIGS. 21(a) and 21(b) illustrate the mounting of a clamping device, such as 68, in a housing 13 of a cover 2'", as shown in FIG. 19. The magnetizable plate 70 is inserted in the member 68, which in turn is introduced into the housing 13 by momentarily deforming resilient retaining elements of this housing surrounding a central opening.

Figure 22:
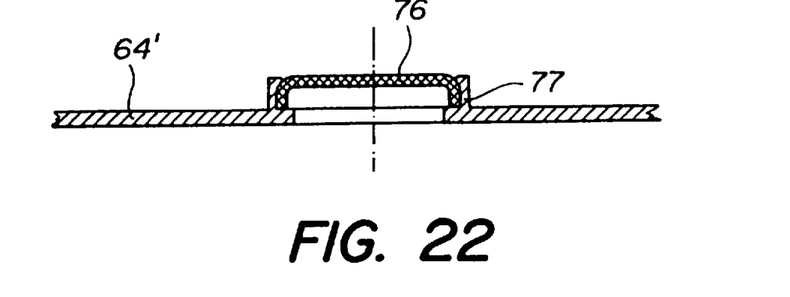
FIG. 22 is a cross-sectional view showing another embodiment of a disc designed for use in a casing according to FIG. 18.

FIG. 22 shows an embodiment of a disc 64', similar to the disc 64 of FIG. 18, which is provided with a clamping element 76 fastened by a snap-on mechanism consisting of fingers 77 protruding from the upper surface of the disc around the central opening thereof.

The cartridge according to the present invention can be used with standard disc casings or disc casings designed as described above. The standardized dimensions and arrangements of such casings allow, in each case, the assembly thereof with a protector member to form a cartridge in accordance with the present invention.

What is claimed is:

1. A disc cartridge including a disc casing which comprises a lower casing element constructed to provide a housing for a recording disc having a central hole, the bottom of the lower casing element comprising an opening, a first part of which is designed to provide a passage for a shaft for driving the disc in rotation, the shaft belonging to a disc-reading apparatus, and a second part of which is designed to provide access for a disc-reading device belonging to the disc reading apparatus, and a casing cover providing a plane wall facing the bottom of the lower casing element, said cartridge further comprising a removable protector member, said protector member comprising a bottom plate providing a wall closing the opening of the bottom of the lower casing element as well as engaging means for engaging the lower casing element so as to keep together the protector member and the lower casing element, said cartridge further comprising a removable locking member placed between the bottom plate of the protector member and the bottom of the lower casing element and separable from the protector member, said locking member comprising locking means adapted to extend through the first part of said opening and to become engaged in the central hole of the recording disc placed in the lower casing element, so as to maintain the recording disc in a fixed position with respect to the lower casing element.

2. A disc cartridge including a disc casing which comprises a lower casing element constructed to provide a housing for a recording disc having a central hole, a bottom of the lower casing element comprising an opening, a first part of which is designed to provide a passage for a shaft for driving the disc in rotation, the shaft belonging to a disc-reading apparatus, and a second part of which is designed to provide access for a disc-reading device belonging to the disc reading apparatus, and a casing cover constructed in such a manner as to make possible the closing or the opening of the casing, said cover providing a plane wall facing the bottom of the lower casing element, said cartridge further comprising a protector member forming a drawer arranged for removably and slidably receiving at least said lower casing element, said protector member comprising a bottom plate, at least two side-wall portions and a back wall portion, said bottom plate providing a wall closing at least said second part of said opening of the bottom of the lower casing element when the lower casing element is placed in said protector member, the bottom plate slidably received along the bottom of the casing element, said wall portions being each provided with a ledge extending from a free edge of said wall portions over at least a portion of the length of said free edge so as to retain said lower casing element when the lower casing element is placed in said protector member, the ledge receivable over the plane wall of the casing cover facing the bottom of the lower casing element, wherein said ledge of said back-wall is arranged for retaining said cover of said lower casing element when said lower casing element and said cover are placed in said drawer, the disc cartridge further comprising a removable locking member, said locking member comprising at least a first portion arranged for fitting into said first part of the opening in said bottom of said lower casing element, said locking member being arranged for being maintained in place when said first portion of the locking member is fitted into said first part of said opening and the lower casing element is placed inside the drawer, said first portion of said locking member comprising locking means adapted for becoming engaged in the central hole of said recording disc for maintaining said disc in a fixed position with respect to the bottom of said lower casing element.

3. A disc cartridge according to claim 2, wherein said locking member comprises a second portion extending across said second part of said opening up to the back-wall portion of said drawer.

4. A disc cartridge according to claim 3, wherein at least a part of said second portion of said locking member is arranged for fitting into said second part of the opening in the bottom of the lower casing element.

5. A disc cartridge including a disc casing which comprises a lower casing element constructed to provide a housing for a recording disc having a central hole, the bottom of the lower casing element comprising an opening, a first part of which is designed to provide a passage for a shaft for driving the disc in rotation, the shaft belonging to a disc-reading apparatus, and a second part of which is designed to provide access for a disc-reading device belonging to the disc-reading apparatus, and a casing cover constructed in such a manner as to make possible the closing or the opening of the casing, the cartridge further comprising a protector member arranged for removably receiving at least said lower casing element, and a locking member engageable with the central hole of the recording disc for locking the disc when the protector member is assembled to the disc casing, said protector member comprising a bottom plate, an end wall portion upstanding from the bottom plate, and a top wall portion extending integrally from the end wall portion over and facing the bottom plate, the bottom plate and top wall portion adapted to slidably receive a portion of the disc casing therebetween in a direction substantially parallel to the bottom plate, the top wall portion extending over the casing cover when the protector member and disc casing are fully assembled such that the disc casing is secured to the protector member and the casing cover is locked in a closed position thereby.

6. The disc cartridge of claim 5 wherein the locking member completely closes the opening in the bottom of the lower casing element.

* * * * *